Nov. 20, 1962 E. D. BARTON ETAL 3,065,314
TIMED CONTROL MECHANISM
Filed Oct. 8, 1959 10 Sheets-Sheet 1

INVENTORS
EDWARD D. BARTON
DONALD W. LAVIANA
BY Carl A. Stickel
THEIR ATTORNEY

INVENTORS
EDWARD D. BARTON
DONALD W. LAVIANA
BY Carl A Stickel
THEIR ATTORNEY

INVENTORS
EDWARD D. BARTON
DONALD W. LAVIANA
BY
THEIR ATTORNEY

Nov. 20, 1962

E. D. BARTON ETAL 3,065,314

TIMED CONTROL MECHANISM

Filed Oct. 8, 1959

INVENTORS
EDWARD D. BARTON
DONALD W. LAVIANA
BY Carl A. Stickel
THEIR ATTORNEY

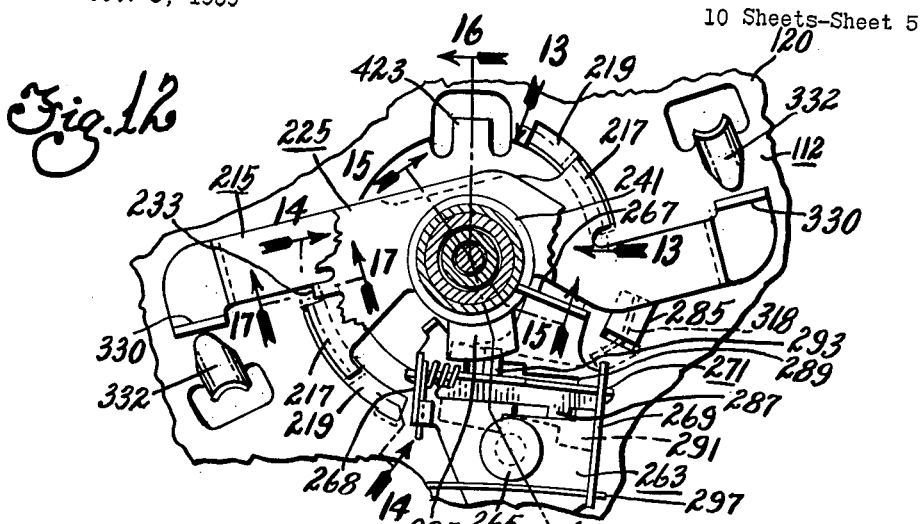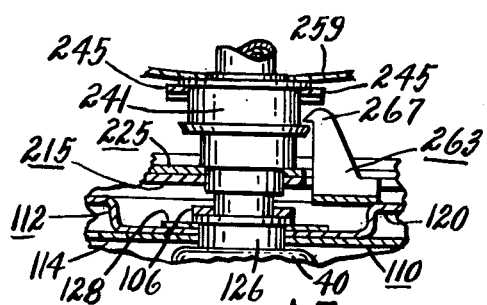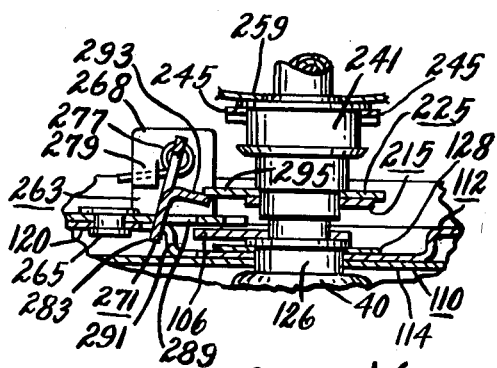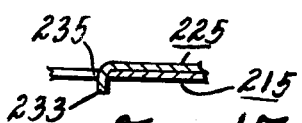

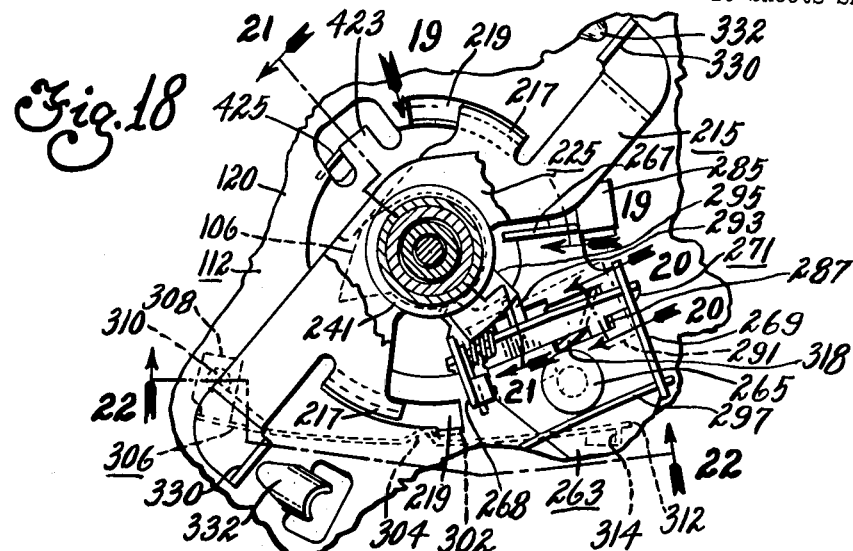
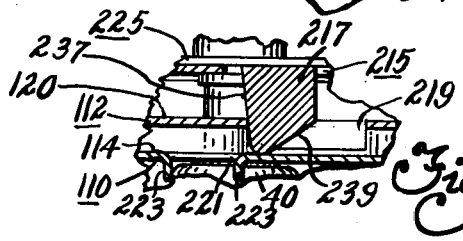
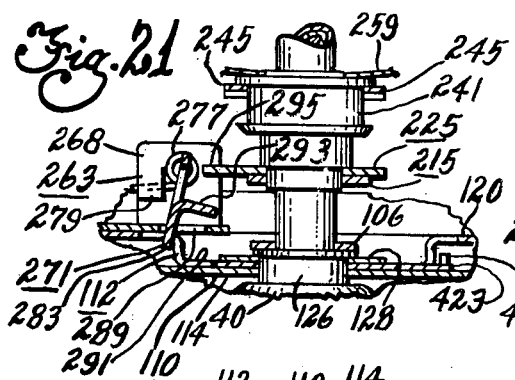
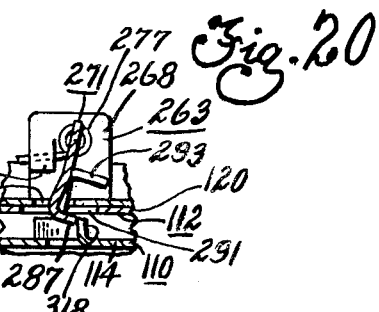
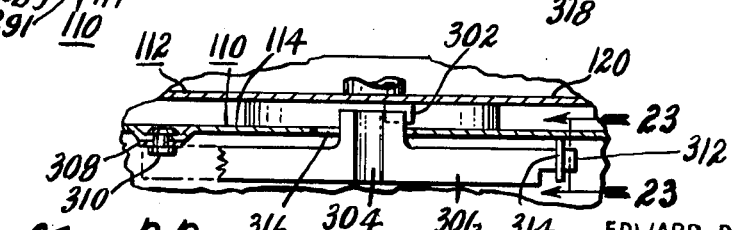
INVENTORS
EDWARD D. BARTON
DONALD W. LAVIANA
THEIR ATTORNEY

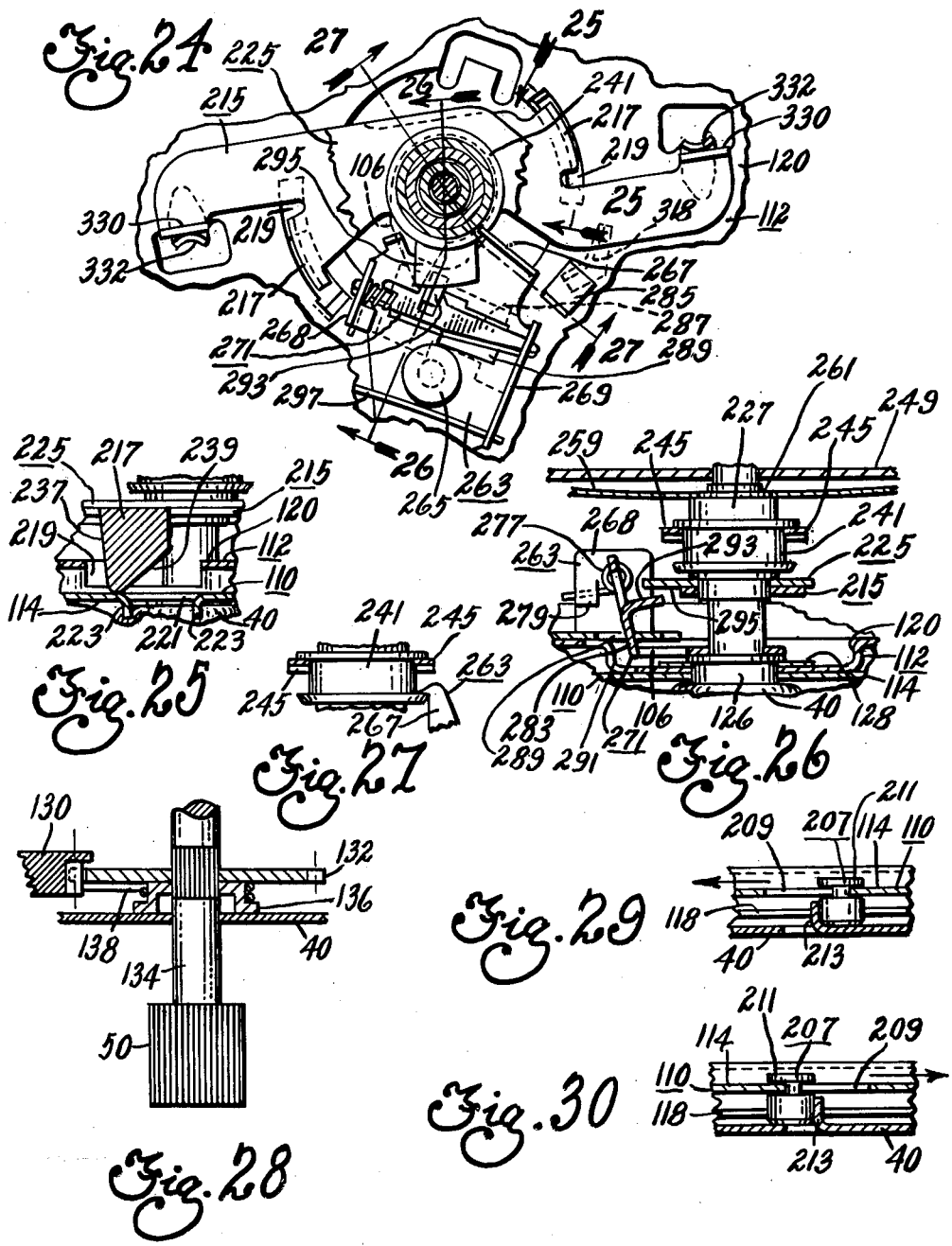

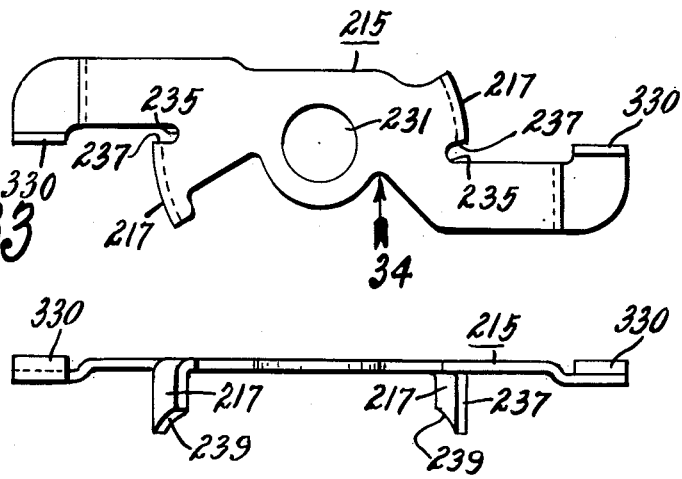

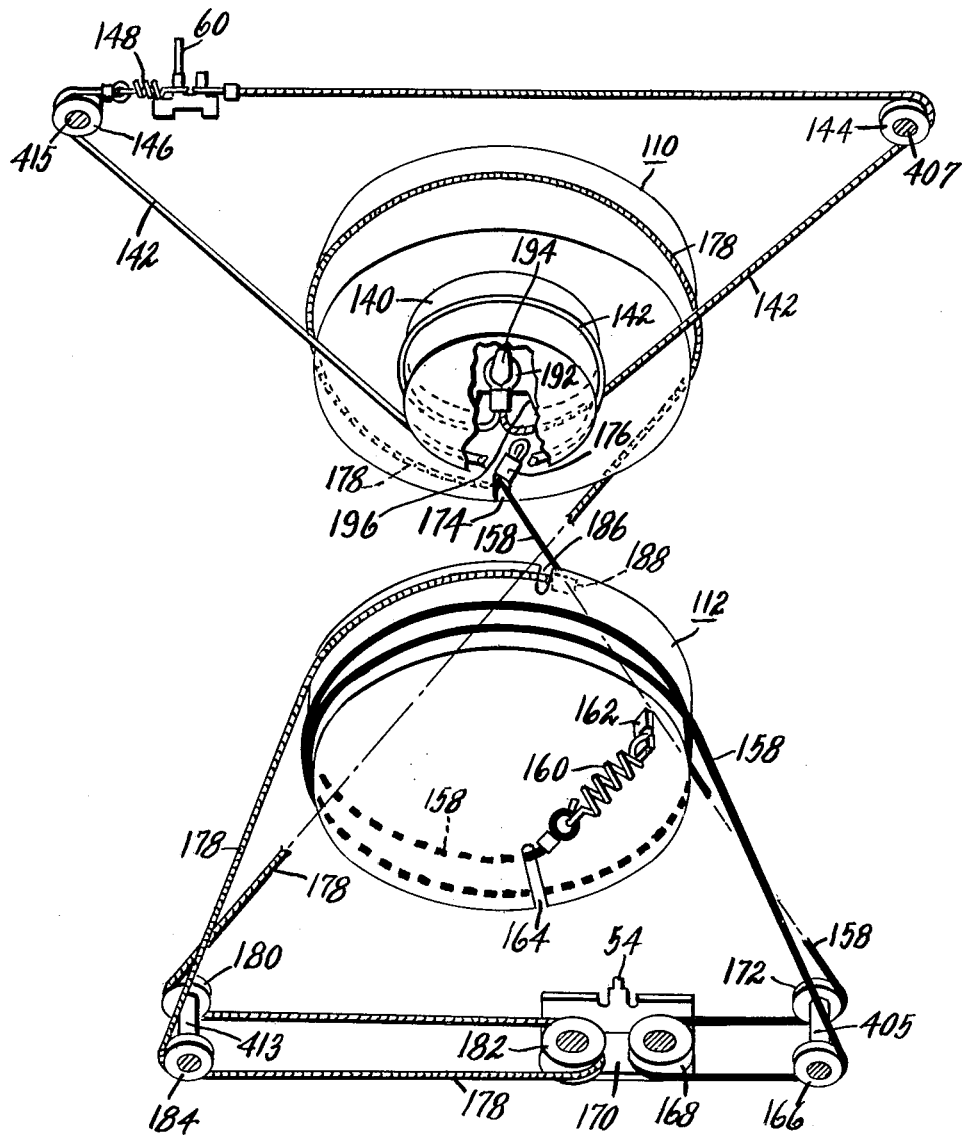

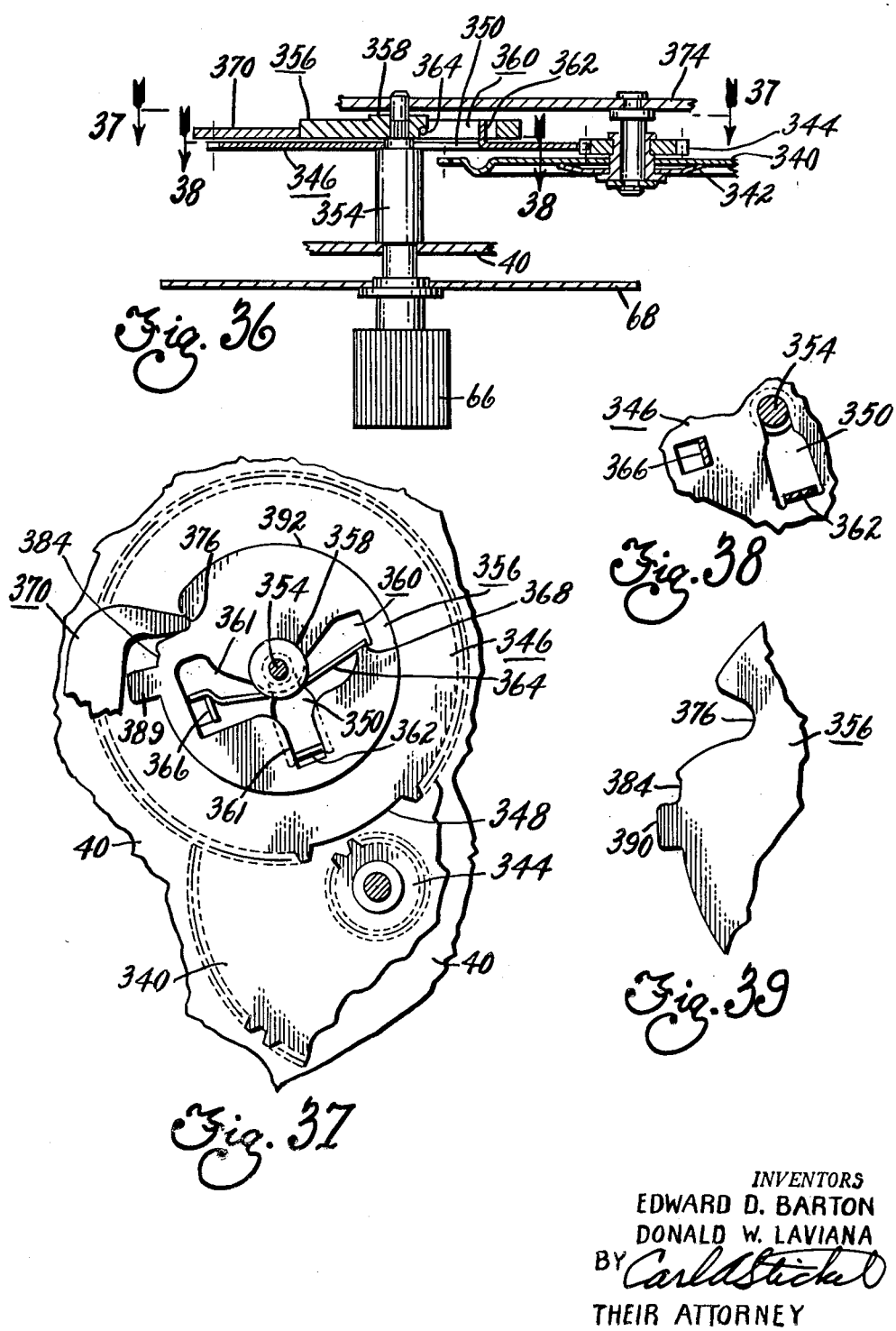

United States Patent Office 3,065,314
Patented Nov. 20, 1962

3,065,314
TIMED CONTROL MECHANISM
Edward D. Barton, Rochester, and Donald W. Laviana, Pittsford, N.Y., assignors to General Motors Corporation, Detroit, Mich., a corporation of Delaware
Filed Oct. 8, 1959, Ser. No. 845,248
11 Claims. (Cl. 200—38)

This application is a continuation-in-part of the copending applications Serial No. 647,377, filed March 20, 1957, now U.S. Patent No. 3,011,034, and Serial No. 654,222, filed April 22, 1957, now U.S. Patent No. 2,910,551.

This invention pertains to a timed control mechanism and more particularly to clock controlled mechanism which may be set to automatically stop operations at any desired time and to start operations at a selected time interval in advance of the stop time and in which a signalling device may be set to provide an audible warning at the end of a selected period of time measured by the clock.

While the timed control mechanism according to the present invention may be used to control the starting and stopping of a wide variety of apparatus, it will be illustrated in this application as applying to its most familiar application, the domestic electric oven. It is known that many housewives who are the recipients of electric ranges having oven clock controls fail to make use of this convenient automatic feature. The apparent reason for this is that they lack confidence in the control and in their ability to set the controls properly.

It is an object of this invention to provide a timed control mechanism in which the indicators displayed and the settings to be made are so legible, clear, reliable and easy to understand, set, operate and control that any housewife may readily learn to use it and to rely upon it.

It is another object of this invention to provide an accurate, reliable, convenient timed control mechanism readily and inexpensively assembled from parts which are inexpensively manufactured to readily achieved standards of accuracy.

It is another object of this invention to provide a simple, accurate, easily manufactured and controlled machanism for establishing the starting and termination of a controlled period which frees the clock motor of the control load at all other times.

It is another object of this invention to provide a simple, inexpensive, accurate, reliable, audible time signal driven by the clock motor during its timed period which will at the end of the timed period automatically free the clock motor of this load and effectively produce an audible signal from the fluctuating magnetic field of the clock motor.

It is another object of this invention to provide a more efficient magnetically actuated vibrating reed.

It is another object of this invention to provide a simple arrangement to facilitate the meshing of a pinion with the teeth of an interrupted gear.

It is another object of this invention to provide separate pulleys coordinated with the starting and stopping times which are made a part of a cable system including a cable differential pulley block which may carry an indicator to indicate the difference between the starting and stopping times.

These and other objects are attained in the form shown in the drawings in which a rectangular front plate is provided with a clock face containing second, minute and hour hands as well as a linear stop cooking scale at the top and a linear hours to cook scale at the bottom. The clock mechanism driving the three clock indicators also drives through gearing a time signal having a pinion meshing with an interrupted gear which is resiliently mounted radially upon a shaft carrying a setting knob, a dial and a cam. The cam has raised portions in the off and the setting time positions to forcibly hold a vibrating reed away from the magnetic core of the clock. The zero position of the dial is coordinated with a notch in the cam to allow the reed to vibrate under the fluctuating magnetic field produced by alternating current energization of the clock motor. The reed is provided with a slightly convex contact surface adapted to contact the core of the clock motor in its vibration to efficiently produce the audible warning.

The shaft which turns the hour hand also is provided with a time drive arm rotating concentrically therewith. A stop cook pulley is rotatable coaxially with the time drive arm and is connected through a direct operating cable with an indicator movable along the upper lineal scale to indicate the stop cooking time. An hours to cook pulley is frictionally connected to the stop cook pulley and is rotatable concentrically with the stop cook pulley. The two pulleys have wrapped about their peripheries two cables extending 180° around to different pulleys upon a double pulley differential pulley block carrying an indicator cooperating with the lower hours to cook scale. The arrangement is such that when the pulleys rotate simultaneously the one cable winds up the same amount as is unwound from the other pulley. The second cable is oppositely connected. The differential pulley block will then indicate only the relative movement of the two pulleys. Each of the pulleys are provided with peripheral teeth engaged by gearing connected to separate setting knobs. The gearing connected to the stop cook setting knob is provided with a spring detent to hold the stop cook pulley after it has been set while the hours to cook pulley is set to the desired cooking period.

A U-shaped switch bridge has projecting prongs extending through arcuate slots in the hours to cook pulley which terminate in cam surfaces cooperating with slots in the stop cook pulley. The switch bridge through a loose connection with an auxiliary bridge to which is fixed a sleeve concentric with the pulleys slidably carrying a control spool against which bears a forked arm operably connected with the switch contact mechanism which is normally connected in series with the electric oven or other device or appliance to be controlled. When it is desired that the timed control mechanism not control the range or appliance, the hours to cook setting knob is turned to the manual position in which the coaction between the time drive arm, a set of levers upon the hours to cook pulley, the switch bridge and the stop cook pulley causes an axial movement of the auxiliary bridge and its sleeve as well as the control spool to free the biased control switch mechanism for movement to and stationing in the closed contact position. The hours to cook pulley is provided with a latch lever pivoted upon an axis parallel to its axis of rotation. In its rotation with the hours to cook pulley to the manual position, this latch lever engages a cam projecting from the stop cook pulley by which its latch portion is moved away from the control spool to free it so as to permit the control switch to move to and remain in the closed position. This latch lever is provided with a transversely pivoted spring biased time lever pivoted on a transverse axis having one projection engaged by the aforesaid cam in the manual position to move its driving projection out of the path of the time drive arm against its spring bias to free the time drive arm and the entire clock mechanism of the load of the control mechanism.

When the hours to cook pulley is moved from the manual position to the off position, the bridges and the control spool are moved axially by a leaf spring having a greater force than the bias of the switch contact mechanism when the projections of the switch bridge enter the slots of the stop cook pulley. In this movement, the hours to cook pulley rotates about its axis sufficiently to move the projection of the time lever away from the cam upon the stop cook pulley to free it and the latch lever so that the latch portion of the latch lever can move into engagement with the control spool. The auxiliary bridge has a radial projection engaging an upper projection upon the time lever to pivot the time lever against its bias to move the driving projection of the time lever out of the path of the time drive arm to keep the arm free of the driving engagement with the control mechanism.

When the hours to cook are set, the pulley is moved away from the off position and the prongs of the switch bridge coact with the ends of the slots in the stop cook pulley while the radially extending arms of the switch bridge coact with camming projections on the hours to cook pulley to move the bridges axially away from the pulleys against the force of the leaf spring. The control spool is prevented from moving under the bias of the control switch mechanism by the latch projection of the latch lever which prevents the switch mechanism from being closed until the time is reached at which cooking is to start. The axial movement of the auxiliary bridge moves its projection away from the third projection of the time lever allowing the spring bias of the time lever to move its drive projection into the path of the time drive arm. The time drive arm reaches this drive projection at the start cooking time and engages it to pivot the latch lever so that its latch projection is disengaged from the control spool allowing the control spool to move with the control switch mechanism which moves under its own bias to the closed circuit position. The latch lever pivots against a stop upon the hours to cook pulley enabling the time drive arm to positively drive the hours to cook pulley while the stop cook pulley is prevented from rotating by the spring detent upon the gearing of its setting mechanism.

When the stop cooking time is reached, the prongs of the switch bridge drop through the slots in the stop cook pulley allowing the switch and auxiliary bridges as well as the control spool to move axially under the force of the leaf spring to carry the switch contact mechanism to the open circuit position. The axial movement of the auxiliary bridge carries its radial projection into contact with the upper projection upon the time lever which moves the driving projection on the time lever out of the path of the time drive arm to effect a disengagement therefrom so as to free the clock motor from driving the control mechanism. The hours to cook indicator moves with the hours to cook pulley and continuously indicates the hours to cook remaining which diminishes to zero at the stop cooking time.

Further objects and advantages of the present invention will be apparent from the following description, reference being had to the accompanying drawing wherein preferred embodiments of the invention are clearly shown.

In the drawings:

FIGURE 12 is an enlarged fragmentary view of the central control mechanism shown in FIGURE 7 as positioned in the zero or off position;

FIGURE 13 is a fragmentary sectional view taken along the line 13—13 of FIGURE 12;

FIGURE 14 is a fragmentary sectional view taken along the line 14—14 of FIGURE 12;

FIGURE 15 is a fragmentary sectional view taken along the line 15—15 of FIGURE 12;

FIGURE 16 is a fragmentary sectional view taken along the line 16—16 of FIGURE 12;

FIGURE 17 is a fragmentary sectional view taken along the line 17—17 of FIGURE 12;

FIGURE 18 is a fragmentary view of the central control mechanism similar to that shown in FIGURE 12 positioned in the M (manual) position;

FIGURE 19 is a fragmentary sectional view taken along the line 19—19 of FIGURE 18;

FIGURE 20 is a fragmentary sectional view taken along the line 20—20 of FIGURE 18;

FIGURE 21 is a fragmentary sectional view taken along the line 21—21 of FIGURE 18;

FIGURE 22 is a fragmentary sectional view taken along the line 22—22 of FIGURE 18;

FIGURE 23 is a fragmentary sectional view taken along the line 23—23 of FIGURE 22;

FIGURE 24 is an enlarged fragmentary view of the central mechanism similar to FIGURES 12 and 18 but positioned in the set position;

FIGURE 25 is a fragmentary sectional view taken along the line 25—25 of FIGURE 24;

FIGURE 26 is a fragmentary sectional view taken along the line 26—26 of FIGURE 24;

FIGURE 27 is a fragmentary sectional view taken along the line 27—27 of FIGURE 24;

FIGURE 28 is an enlarged fragmentary sectional view taken along the line 28—28 of FIGURE 11;

FIGURE 29 is an enlarged fragmentary sectional view taken along the line 29—29 of FIGURE 11 with the stop cook pulley shown in one extreme position;

FIGURE 30 is an enlarged fragmentary sectional view also taken along the line 29—29 of FIGURE 11 with the stop cook pulley shown in the extreme opposite position 372° away from the position shown in FIGURE 29;

FIGURE 31 is a plan view of the auxiliary bridge and its sleeve;

FIGURE 32 is a view in elevation of the auxiliary bridge and sleeve as shown in FIGURE 31 taken in the direction of arrow 32;

FIGURE 33 is a plan view of the switch bridge;

FIGURE 34 is a view in elevation of the switch bridge taken in the direction of the arrow 34 shown in FIGURE 33;

FIGURE 35 is a perspective view, partly diagrammatic, of the pulleys and cable indicating system shown in FIGURE 7;

FIGURE 36 is an enlarged fragmentary sectional view taken along the line 36—36 of FIGURE 6;

FIGURE 37 is a fragmentary sectional view taken along the line 37—37 of FIGURE 36;

FIGURE 38 is a fragmentary sectional view taken substantially along the line 38—38 of FIGURE 36; and FIGURE 39 is a fragmentary view illustrating a modification of the cam shown in FIGURE 37.

The Front

Figure 1:
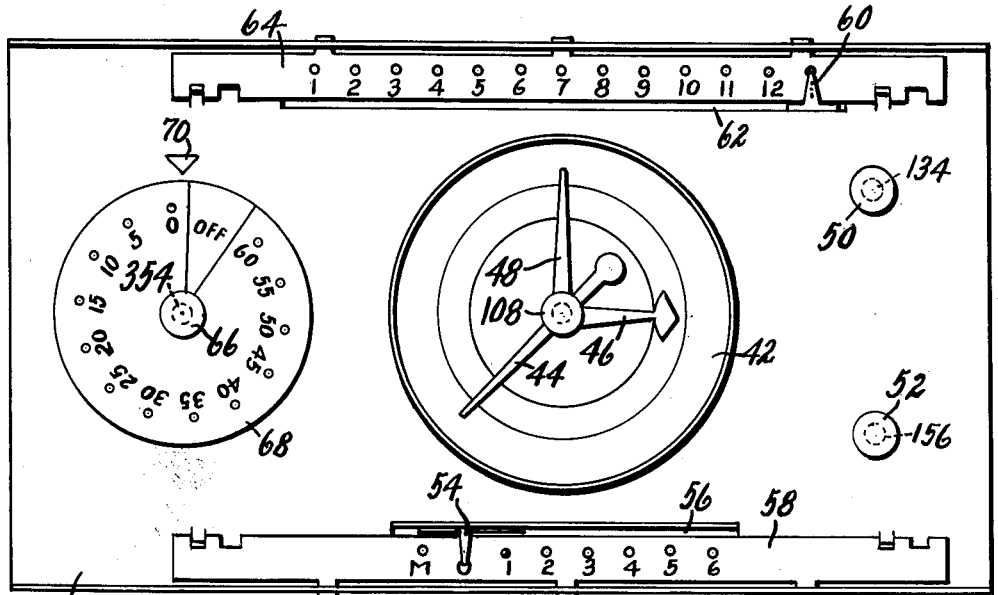
FIGURE 1 is a front view of the time control mechanism in the off position showing the front plate, the indicators and their scales as well as the setting knobs.
Figure 4:
FIGURE 4 is a fragmentary sectional view taken along the line 4—4 of FIGURE 3.

Referring now to FIGURE 1, the timed control mechanism is shown as having a rectangular face plate 40 provided with a clock face 42 within which are the sweep second hand 44, the hour hand 46 and the minute hand 48. These cooperate with the usual hour figures one to twelve (not shown) which may be provided either on the clock face 42 or on the glass cover (not shown) for the face plate 40. At the right of the clock face 42 are the stop cook setting knob 50 and the hours to cook setting knob 52 located beneath the stop cook setting knob 50. The hours to cook setting knob is connected to the linearly movable indicator 54 projecting through the slot 56 along the lower edge of the face plate 40 cooperating with the hours to cook scale 58 provided with the legends M for manual and zero to six inclusive to indicate the hours to cook setting. The zero position is the off or open circuit position while the manual position is a continuously closed circuit position. Adjacent the upper edge of the face plate 40 is an indicator 60 projecting through the horizontal slot 62 and moved linearly by the stop cook setting knob 50 for cooperating with the linear stop cook setting scale 64 containing the legends one to twelve inclusive to provide a full twelve-hour scale. At the left of the clock face 42 are the setting knob 66 and a dial 68 cooperating with the indicator 70 for setting and indicating the setting of an audible time signal or minute minder.

The Clock

Figure 2:
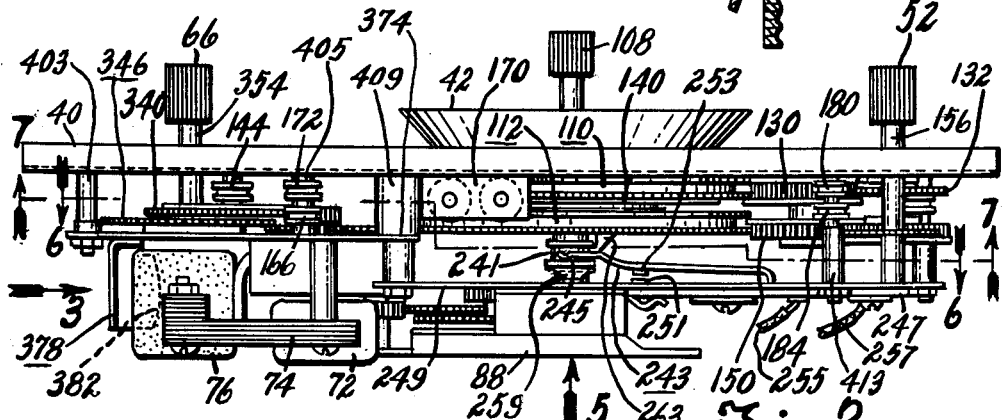
FIGURE 2 is a bottom view of the control mechanism shown in FIGURE 1 as indicated by the arrow 2.
Figure 3:
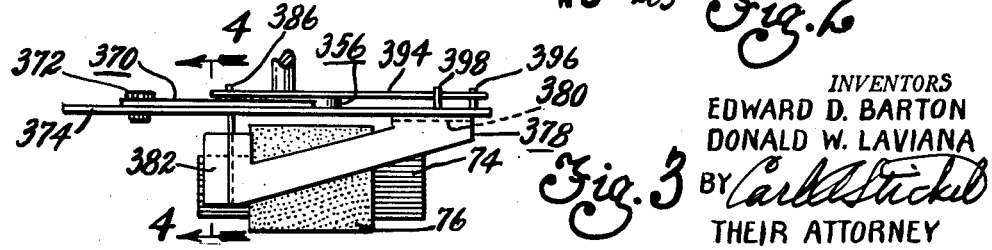
FIGURE 3 is an end view of the time control mechanism as indicated by the arrow 3 in FIGURE 2.
Figure 5:
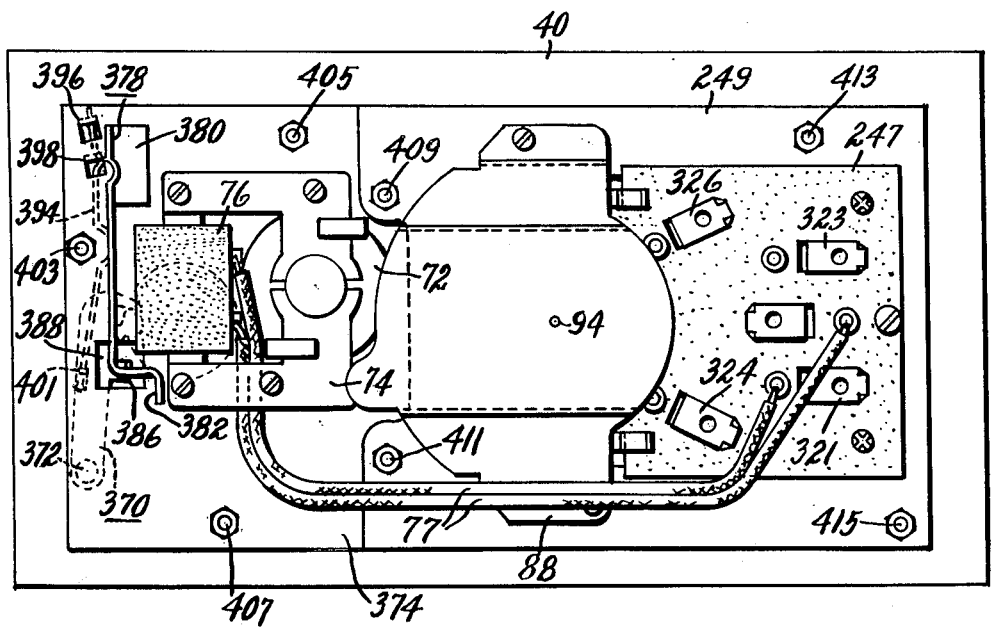
FIGURE 5 is a back view of the timed control mechanism as indicated by the arrow 5 in FIGURE 2 with the audible signal in the warning position.

Both the audible signal and switch controlling mechanisms are driven by the synchronous clock motor 72 provided with a stator 74 and a field winding 76 as shown in FIGURES 2 and 5. The clock motor 72 through conventional gearing drives the pinion 78 shown in FIGURE 10 which through the gear 80 drives the pinion 82 connected by the inner sleeve 84 to the sweep second hand 44. The gear 80 is also directly connected to a pinion 86 supported by the gear bridge and cover 88. This pinion 86 meshes with the minute gear 90 which through the clutch spring 92 and the minute shaft 94 connect with and drive the minute hand 48 (FIGURE 1). The minute gear 90 is also frictionally connected through the clutch spring 92 and minute pinion 95 in driving engagement with a reduction gear 96 fixed to the pinion 98 driving the hour gear 100. The hour gear 100 connects through the hub 102 with the hour tube 104 which in turn connects with and rotates the hour hand 46. The clock mechanism is set by the setting knob 108 which is fixed to the front end of the minute shaft 94. The clutch spring 92 makes this manipulation possible without interference. This mechanism so far described constitutes an ordinary electric clock mechanism. The control function of the mechanism is primarily controlled by the time drive arm 106 fixed to the hour tube 104 which rotates at all times with the hour hand 46 so that it establishes the time of the day for the control mechanism.

The Stop Cooking and Hours to Cook Pulleys

Figure 7:
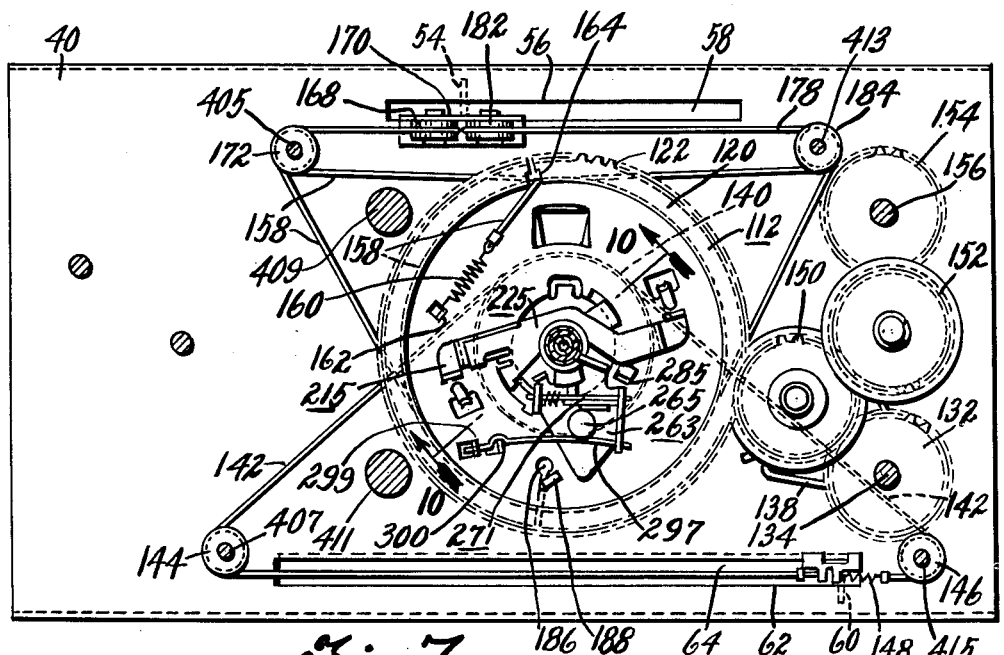
FIGURE 7 is an irregular sectional view taken substantially along the line 7—7 of FIGURE 2 with the control mechanism shown in the off position.
Figure 11:
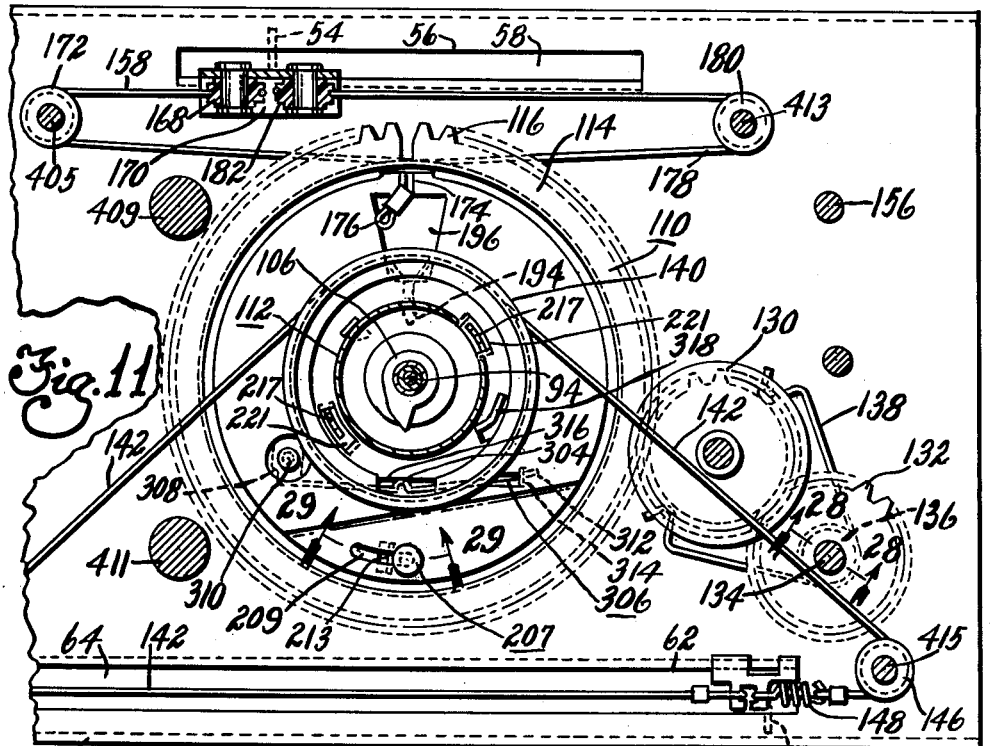
FIGURE 11 is an enlarged fragmentary view taken substantially along the line 11—11 of FIGURE 10 with the control mechanism shown in the off position.
Figure 10:
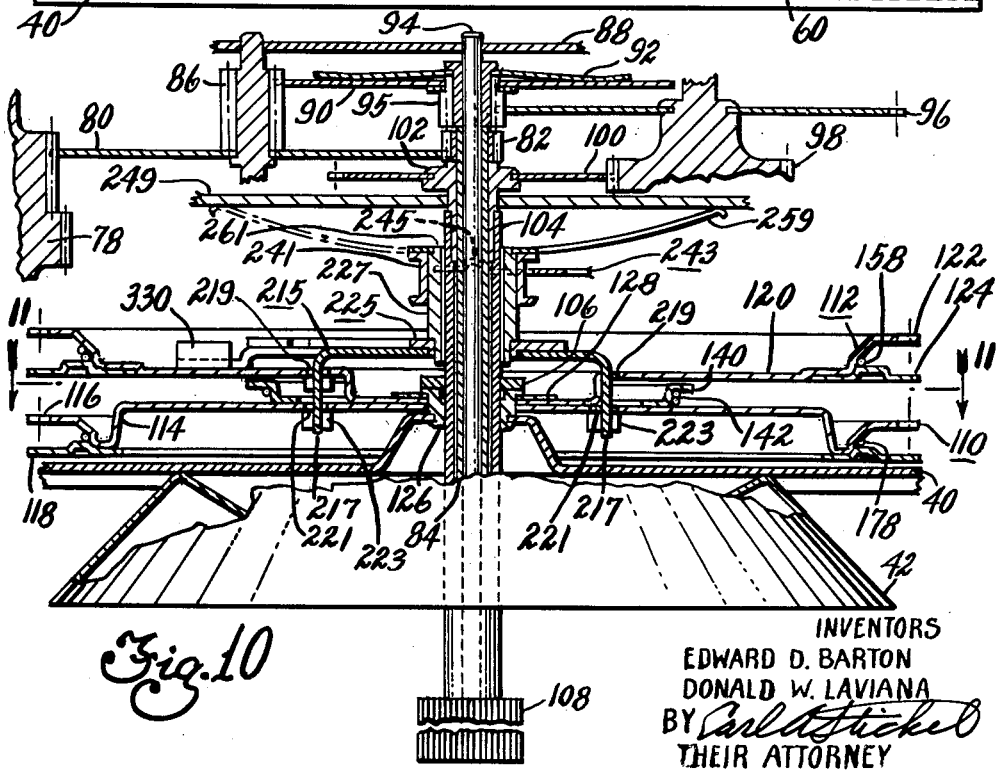
FIGURE 10 is a fragmentary sectional view taken substantially along the line 10—10 of FIGURE 7 with the control mechanism shown in the off position.

The rotational or angular relationship of the stop cook pulley 110 and the hours to cook pulley 112 with the time drive arm 106 determine the stop cooking and start cooking times respectively (FIGURES 7, 10, 11). The stop cook pulley 110 (FIGURE 10) is formed by a plate 114 provided with a toothed flange 116 which also forms one side of the pulley rim. The opposite side of the pulley rim is provided by a ring 118 which is welded to the plate 114. The hours to cook pulley is formed by a plate 120 offset to form a toothed flange 122 forming one-half of the pulley rim while the ring 124 forms the other half of the pulley rim or flange and is welded to the plate 120. The plates 120 and 114 are rotatably mounted upon a stationary hub 126 fixed to a central recessed portion of the front plate 40. The stop cook pulley 110 and the hours to cook pulley 112 are frictionally connected with the hub 126 and each other by a spring washer 128 also mounted on the hub 126. The toothed flange 116 of the stop cook pulley 110 meshes with the large stop cook pulley idler pinion 130 which in turn meshes with the stop cook setting pinion 132 fixed to the shaft 134 on which is mounted the stop cook setting knob 50 (see FIGURE 28). Also fixed to the shaft 134 is a small drum 136 having the central coiled portion of the detent spring 138 wrapped around it. The two arms of the spring 138 have inturned humped ends extending into engagement with the teeth of the pinion 130 so as to resiliently hold the stop cook pulley 110 and the pinion 130 from rotation excepting when set by the setting knob 50.

The Stop Cooking Indicator

The plate 114 is provided with an additional pulley flange 140 (FIGURE 11) welded to it of half the diameter of the peripheral flanges it is provided with. Wrapped around this pulley flange 140 is a cable 142 having its opposite ends extending to and around the idler pulleys 144 and 146 provided at opposite ends of the stop cook scale 64 and connecting with the indicator 60 as shown in FIGURE 7. The term cable as used in this application is intended to include any strong, flexible tension member of limited elasticity, the various forms of which include a cord, filament, string, thread, twine and wire. One end of this cable 142 connects with the indicator 60 through a spring 148 for maintaining tension upon the cable 142 at all times.

The Hours To Cook Indicator

The hours to cook pulley 112 has its toothed flange 122 in engagement with an idler pinion 150 (FIGURE 7) connected through the second idler pinion 152 and a setting pinion 154 with a shaft 156 to which is fixed the hours to cook setting knob 52. The angular position of the hours to cook pulley 112 relative to the stop cooking pulley 110 is indicated by a cable differential arrangement best shown in FIGURE 35. One cable 158 is connected at one looped end by a coil spring 160 to an anchoring projection 162. From this spring anchored end, it extends through the notch 164 in the rim or flange 122 and extends in a clockwise direction one and a half turns around the hours to cook pulley 112 to and around the idler pulley 166 and thence to and 180° around the right pulley 168 upon the double pulley block 170 carrying the indicator 54 which projects through the horizontal slot 56 in the face plate 40. From the right pulley 168, the cable 158 extends to and around the second idler pulley 172 to the stop cook pulley 110 provided with a slot 174 through which this cable 158 extends to the block 176 held in the slot 174. Also connected to the block 176 and held thereby is one end of a second cable 178 extending from the slot 174 clockwise around the stop cook pulley 110 and thence extending to and around the idler pulley 180 and to and 180° around the second pulley 182 upon the pulley block and thence back to and around the idler pulley 184 and up over the hours to cook pulley 112 in a clockwise direction to the notch 186 through which it extends and is held by a block 188 fastened to its end.

This differential cable arrangement indicates the hours to cook by indicating the angular amount that the hours to cook pulley 112 is advanced in a counterlockwise direction ahead of the stop cook pulley 110. The rotation of both pulleys 110 and 112 simultaneously will not move the pulley block 170 or the hours to cook indicator 54. Each of the cables 158 and 178 will merely unwind an amount from one pulley and wind up an equal amount upon the other pulley. Any movement of the hours to cook pulley 112 relative to the stop cook pulley 110 will move the pulley block 170 and the indicator 54 linearly of the hours to cook scale 58.

The position of the stop cook pulley 110 relative to the time drive arm 106 is indicated by a third cable 142 having a loop 192 hooked over a hook 194 and extending therefrom through an opening 196 onto the small diameter pulley flange 140 and is wrapped in opposite directions around this flange with one end extending to and about the idler pulley 146 and provided with a looped and connected by a tension coil spring to the stop cook indicator 60. The opposite end of the cable 142 extends to and around the idler pulley 144 to the indicator 60. This indicator 60 is then suspended between the two ends of the cable 142. The pulley flange 140 is only half the diameter of the pulley flanges of the stop cook pulley 110 and the hours to cook pulley 112 in order to make the hour indications on both the hours to cook scale and the stop cook scale the same distance apart. The reason for this is that a rotation of the hours to cook pulley 112 relative to the stop cook pulley 110 will move the pulley block 170 only one-half the length of the arc through which the periphery of the hours to cook pulley 112 has moved relative to the stop cook pulley 110.

The stop cook pulley 110 is limited to approximately one revolution by a rivet 207 (see FIGURES 11, 29 and 30) which is slidably mounted in the slot 209 in the stop cook pulley 110. This rivet 207 has an enlarged head 211 adapted to engage the projection 213 of the front plate 40 which is turned into the path of the head 211. When the stop cook pulley 110 is turned in either direction of rotation, it will engage the projection 213 to prevent more than one complete revolution. The movement of the rivet 207 in the slot 209 insures that a full 360° is permitted so that the stop cook pulley may be set to any time throughout the twelve-hour period indicated by the hour hand of the clock and the stop cooking indicator 60.

The Switch Control

The switch actuation is provided through the use of a switch bridge 215 (FIGURES 33, 34) having two camming prongs 217 located diametrically oppositely and extending parallel to the axis of the tubes 84 and 104 (FIGURE 10) through a pair of diametrically opposite slots 219 (FIGURES 12–14) in the hours to cook pulley 112 and a pair of diametrically opposite slots 221 (FIGURE 11) in the stop cook pulley 110. The slots 221 in the stop cook pulley 110 are provided with camming projections 223 at the opposite ends of the slots which cooperate with the cam surfaces 239 upon the ends of the camming prongs 217 to cam the switch bridge 215 axially upon a predetermined relative rotation thereof.

The switch bridge 215 is loosely connected to the auxiliary bridge 225 (FIGURES 31, 32) fixed to a sleeve 227 slidably mounted upon the tube 104 as shown in FIGURE 10. The sleeve 227 has a projection 229 of reduced diameter extending through the central aperture 231 of the switch bridge 215 with a relatively loose fit. The auxiliary bridge 225 also has a downwardly extending finger 233 which loosely fits into one of the notches 235 in the switch bridge 215 so as to provide a loose rotative connection between the two. The camming projections 217 are provided with steep cam surfaces 237 upon one edge and small angled cam surfaces 239 upon the end edge. The loose connection of the projection 229 in the aperture 231 and the finger 233 in one of the notches 235 reduces the requirement for accuracy between the switch bridge 215 and the hours to cook and stop cook pulleys 112 and 110 since it permits the switch bridge to adjust to slight variations in the location of the slots 219 and 221. If, for example, one of the camming prongs 217 should drop into the adjacent slot 221 before the other prong 217 drops into its slot, any serious binding is prevented and the switch bridge 215 will continue to hold the auxiliary bridge without any substantially axial movement until the second camming prong 217 drops into the other slot 221. The loose connection of the switch bridge 215 with the auxiliary bridge 225 facilitates the dropping of both camming prongs 217 into both of the slots 221 so that accuracy is preserved even though the dimensional tolerances of the camming prongs 217 and the slots 221 may not be extremely accurate.

Figure 6:
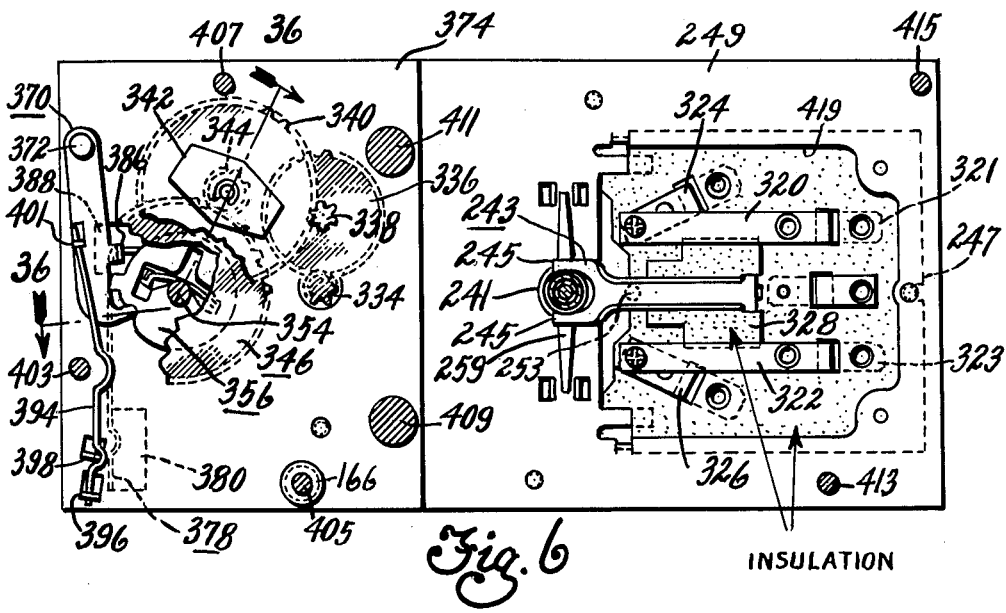
FIGURE 6 is an irregular sectional view taken along the line 6—6 of FIGURE 2 with the audible signal in the warning position.

Slidably mounted upon the auxiliary bridge sleeve 227 is the control spool 241. Between the upper and lower flanges of the control spool 241 is the forked end of a biased switch actuator arm 243 having diametrically opposite humps 245 which are normally spring pressed against the lower face of the upper flange of the control spool 241 as viewed in FIGURE 10. As is shown diagrammatically in FIGURE 2, the switch actuator arm 243 is a part of a folded back spring arm anchored to a member 247 fastened to the large back plate 249. The member 247 also supports a stationary contact 251 adapted to cooperate with a movable contact 253 to close the circuit to the device to be controlled. These contacts 251 and 253 are insulated from each other in the open circuit position and connect to conductors 255 and 257 in series with the supply conductor for the appliance to be controlled. The preferred switch construction is shown in FIGURE 6. The control provides duplicate switch mechanisms as shown in FIGURE 6 so that both supply circuits may be broken. Two spring biased movable contact mechanisms 320 and 322 which connect to the supply conductors through terminals 321, 323 are provided which are biased to the closed position to make contact with the stationary contacts 324 and 326 which connect to the electric oven or other device to be controlled. The movable contacts 320 and 322 are connected by a bridge 328 of electrical insulating material to the switch contact operating mechanisms 243 having the forked end 245 engaging the control spool 241. The coil 76 of the clock motor 72 is continuously energized through the conductors 77 (FIGURE 5) which are connected through the terminals of the spring contacts 320, 322 to an electrical supply source for continuous indication of time similarly to any ordinary electric clock.

The switch actuator arm 243 is normally biased to the closed circuit position in which the contacts 251 and 253 are in engagement. To provide a force to open or separate the contacts 251 and 253, there is provided a semi-elliptic leaf spring 259 (FIGURES 6, 10) having its arms bearing against the back plate 249 and having a central eyelet resting upon a shoulder 261 (FIGURES 31, 32) provided upon leaf spring 259 urges the auxiliary bridge 225, the bridge 215 and sleeve 227 toward the pulleys 110 and 112. The central eyelet portion limits the upward movement of the control spool 241 and is capable of forcing the control spool 241 downwardly along with the auxiliary bridge sleeve 227 when the prongs 217 of the switch bridge 215 drop through the slots 221 in the stop cook pulley 110. This operation moves the switch actuator arm 243 downwardly to the open circuit position shown in FIGURES 2, 15 and 27.

Figures 8, 9:
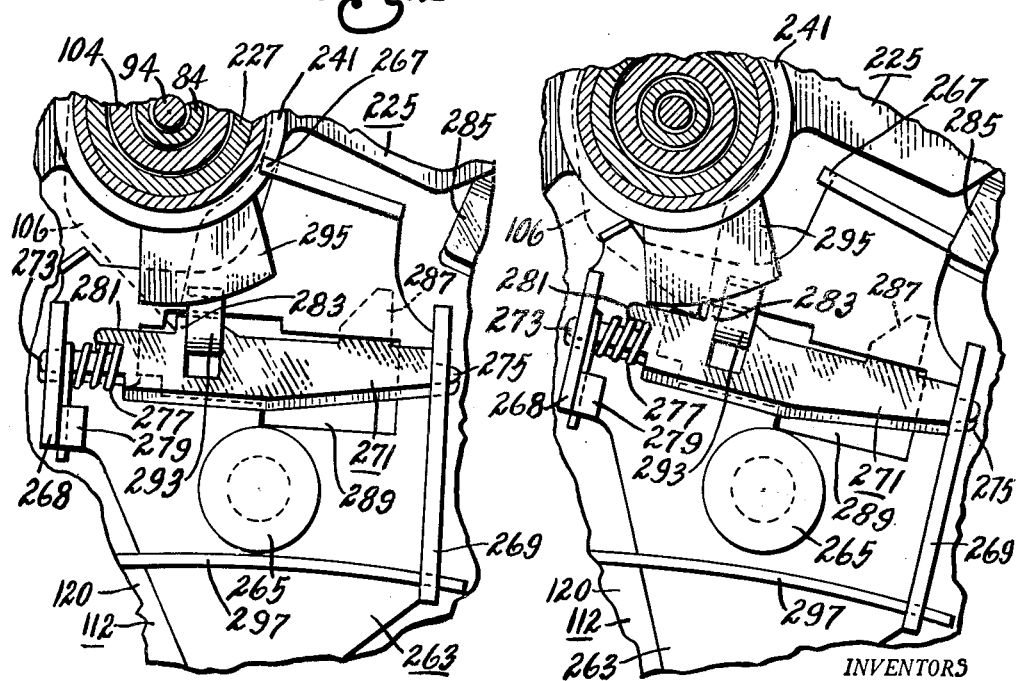
FIGURE 8 is an enlarged fragmentary view of the start cooking mechanism in position just prior to the beginning of the start cooking period.
FIGURE 9 is an enlarged fragmentary view similar to FIGURE 8 of the start cooking mechanism shown in FIGURE 7 at a time after the beginning of the start cooking period.

The control spool 241 and the switch actuator arm 243 are further controlled by a latch lever 263 (FIGURES 7–9) pivoted upon the rivet 265 upon an axis parallel to the axis of the concentric shafts 94, 84 and 104. This rivet 265 is fastened upon the upper face of the hours to cook pulley 112. The latch lever 263 at one edge is provided with a latching hook 267 movable into and out of the space between the flanges of the control spool 241 as shown in FIGURES 8 and 9. The latch lever 263 is urged in a counterclockwise direction as viewed in FIGURES 8 and 9 at all times by the cantilever wire spring 297 anchored at one end to the projection 299 upon the hours to cook pulley 112 and provided with a hump held by the projection 300 also on the hours to cook pulley. The latch lever 263 is provided with opposite flanges 268 and 269 having apertures serving as bearings for the end projections 273 and 275 of the time lever 271 pivoted on an axis transverse to the axis of the rivet 265. This time lever 271 is biased in the counterclockwise direction about the pivoting end projections 273 and 275 by a fine wire torsion spring 277 having one end held under the projection 279 on the latch lever 263 and the other end held by the projection 281 of the time lever 271.

The time lever 271 has a driving projection 283 adapted to be moved into the path of the time arm 106 as shown in FIGURE 9. This projection 283 constitutes a driving projection for the time lever 271 as well as the latch lever 263. Since the hours to cook pulley is normally frictionally held, the engagement of the time arm 106 with the driving projection 283 will pivot the latch lever 263 against the light force of the cantilever wire spring 297 from the position shown in FIGURE 8 in which the latching hook 267 is between the flanges of the control spool 241 to the position shown in FIGURE 9 against the stop 285 of the hours to cook pulley 112 so as to provide a means of driving the hours to cook pulley from the start cooking position to the stop cooking position. In the position shown in FIGURE 9, the latching hook 267 is withdrawn from between the flanges of the control spool 241. The time lever 271 has a lower projection 287 at one end extending through an aperture 289 in the latch lever 263. The edges of this aperture 289 limit the rotation of the time lever to movements between the positions shown in FIGURES 16 and 26. The hours to cook pulley has a larger opening 291 to allow the projections 283 and 287 to freely pass through it. The time lever 271 has an upper projection 293 located over the projection 283 in FIGURES 8 and 9. This projection 283 extends laterally of the time lever 271 beneath the radial projection 295 of the auxiliary bridge 225.

*The Manual Position*

When the clock control mechanism is not in use, the hours to cook knob 52 is turned so as to place the indicator 54 in the manual position indicated M in FIGURE 1. This turns the hours to cook pulley 112 in the clockwise direction as viewed in FIGURES 7 to 9, for example (while the stop cook pulley 110 is stationary) until a projection 302 extending from the hours to cook pulley 112 toward the stop cook pulley 110 passes over the hump 304 upon a leaf spring 306 (FIGURE 22) and the radial tab 423 (FIGURES 18 and 21) extending from the hours to cook pulley 112 engages the struck up projection 425 upon the stop cook pulley 110. This provides a resiliently held connection between the pulleys 110 and 112. The leaf spring 306 has a bent end portion 308 riveted by the rivet 310 to the stop cook pulley 110 and a second end 312 held by a projection 314 up the stop cook pulley 110. This supports the leaf spring 306 so that it acts as a semi-elliptic spring. The hump 304 projects through an aperture 316 in the stop cook pulley 110 as shown in FIGURE 22 so that it is in the path of the projection or tab 302 extending from the hours to cook pulley 112. The movement of the hours to cook pulley relative to the stop cook pulley into the manual position also causes the bent cam 318 projecting from the stop cooking pulley 110 to engage the lower projection 287 upon the time lever 271 as illustrated in FIGURES 18 and 20 so that the latch lever 263 is pivoted clockwise and its latch hook 267 is pulled out of the space between the flanges of the control spool 241 to allow the biased switch actuator arm 243 to move with the control spool 241 to the closed circuit position. This is possible since in the movement to the manual position, the additional movement of the hours to cook pulley 112 relative to the stop cook pulley 110 cams the bridge prongs 217 out of the slots 221 by the assistance of the turned-down projections 223. This moves the switch bridge and auxiliary bridge toward the leaf spring 259 so that the leaf spring 259 is compressed and flattened to the position shown in FIGURE 26 to free upon withdrawal of the latching hook 267 the control spool 241 and the biased switch actuator arm 243 for movement to the closed circuit position in which the contacts 251 and 253 are maintained in engagement. The hump 304 (FIGURE 22) of the leaf spring 306 acts upon the projection 302 to resiliently hold the bent cam 318 in engagement with the lower projection 287 upon the time lever 271 to retain this fixed relationship in the manual position.

*The Off Position*

To place the control mechanism in the off position, the hours to cook setting knob 52 is turned in a clockwise direction to turn the hours to cook pulley 112 in a clockwise direction as viewed in FIGURE 7 to first cause the lower projection 287 of the time lever 271 to be moved away from the cam 318 and to cause the projection 302 (FIGURE 22) to be moved over the hump 304 of the spring 306 on the stop cook pully 110. The camming prongs 217 of the switch bridge 215 are also carried in the clockwise direction by the hours to cook pulley 112 until the camming prongs 217 drop into the slots 221 in the stop cooking pulley 110 as shown in FIGURES 12 to 16 inclusive. Both the switch bridge 215 and the auxiliary bridge 225 are moved axially by the leaf spring 259 in the direction of the front plate 40 so that the radial projection 295 (FIGURES 8, 9) upon the auxiliary bridge 225 engages the upper projection 293 on the time lever 271 to tilt the time lever 271 in a clockwise direction as shown in FIGURE 16 so as to move the driving projection 283 out of the path of the time drive arm 106. The prongs 217 drop into the slots 221 slightly before the projection 287 is completely disengaged from the cam 318 so that the control spool 241 will be carried downwardly before the latch lever 263 moves its latching projection 267 into the space between the flanges of the control spool 241 as shown in FIGURE 15. The movement of the spring 259 and the control spool 241 toward the front plate 40 moves the biased switch actuator arm from the closed position to the open position to provide a corresponding movement of the movable contacts 320, 322 and 253.

*To Set the Hours to Cook*

Preferably, the stop cooking time is first determined by first setting the stop cooking knob 50 and the indicator 60 to simultaneously rotate both pulleys 110 and 112.

To set the hours to cook knob 52 to select an hours to cook period greater than zero, for example, one to six hours, it is turned an additional amount in the clockwise direction to turn the hours to cook pulley 112 a corresponding amount in the clockwise direction moving the indicator 54 a corresponding distance to the right as viewed in FIGURE 1. The hours to cook pulley 112 engages the steep sides of the camming prongs 217 of the switch bridge 215 to rotate the switch bridge until its laterally projecting camming arms 330 engage and are readily lifted by the rounded, inclined camming projections 332 which are struck up from the hours to cook pulley 112 as shown in FIGURE 24. The latch lever 263 is not affected by this camming action and the latching hook 267 by its engagement with the lower flange of the control spool 241 prevents the control spool 241 and the biased switch actuator arm 243 from moving with the switch bridge 215 and the auxiliary bridge 225 so that the switch actuator arm 243 remains in the open circuit position. The control mechanism is now properly set for the timed cooking period to follow. The timed cooking period is determined by the position of the stop cook pulley and indicating mechanism relative to the face 42 of the clock together with the position of the hours to cook pulley relative to and in advance of the stop cook pulley and its indicating mechanism. This also sets and determines the proper positions relative to the time drive arm 106.

*Start Cooking*

The time drive arm 106 rotates constantly during the period prior to the beginning of the hours to cook period.

When the beginning of the hours to cook period is reached, the time drive arm 106 first makes contact with the driving projection 283 upon the time arm 271 as shown in FIGURE 8. The hours to cook pulley 112 at this time is frictionally held by the spring 128 to the stop cook pulley 110 which is more firmly held by the detent spring 138 acting upon the idler pinion 130 which is in engagement with the teeth 116 of the stop cook pulley 110. Because the spring 297 is of fine wires, the pivotal movement of the latch lever 263 about its pivot formed by the rivet 265 has less resistance than the frictional connection of the hours to cook pulley with the stop cook pulley 110. Therefore, the latch lever 263 will pivot clockwise to the position shown in FIGURE 9, withdrawing the latch hook 267 from the control spool 241 to free the control spool 241 for upward movement under the spring bias of the biased switch actuator arm 243. The leaf spring 259 is held up at this time by the raised position of the switch bridge 215 and the auxiliary bridge 225 as shown in FIGURES 25 and 26. When the latching hook 267 frees the control spool 241, the control spool moves upwardly to a position as high as is shown in FIGURE 21. The latch lever 263 continues to pivot until the outer end of the latch projection 267 engages the stop 285 which is struck up from the hours to cook pulley 112. The hours to cook pulley 112 then is driven by the time drive arm 106 with the parts positioned as shown in FIGURE 9. The stop cook pulley 110, however, continues to be held by the detent spring 138.

*Stop Cooking*

The driving of the hours to cook pulley by the time drive arm 106 continues until the prongs 217 of the switch bridge 215 drop through the slots 221 in the stop cook pulley 110 under the force of the leaf spring 259 (FIGURES 13, 14). The leaf spring 259 also moves the sleeve 227, the control spool 241 and the auxiliary bridge 225 toward the front plate 40. This moves the biased switch actuator arm 243 also toward the front plate 40 to operate the contact members 320 and 322 and the contact 253 to the open circuit position (FIGURES 10, 15). This movement toward front plate 40 also causes the radial projection 295 upon the auxiliary bridge to engage the upper projection 293 (FIGURE 16) upon the time lever 271 to move it toward the front plate 40 thereby pivoting the time lever 271 in a clockwise direction from the postion shown in FIGURE 26 to the position shown in FIGURE 16 where the drive projection 283 has been moved out of its driven engagement with the time drive arm 106. This frees the latch lever 263 for counterclockwise movement about the rivet 265 under the force of its biasing spring 297 to move its latching hook 267 back into the groove between the flanges of the control spool 241 as shown in FIGURES 12 and 16. The biased switch actuator arm 243 will now be held in the open circuit position until further manipulation takes place of the manual controls.

*The Audible Time Signal*

The clock motor 72 through the drive pinion 334, (FIGURE 6) the gear 336, the second pinion 338 and the second gear 340 as well as the leaf spring 342 forming a clutch connection with a pinion 344 drives the audible time signal control or minute minder as shown in FIGURES 6, 36 and 37. The pinion 344 is adapted to normally rotate out of mesh with the interrupted gear 346. The gear 346 has an interrupted toothed section 348 which is positioned adjacent the pinion 344 when the audible time signal or minute minder is in the zero or off positions. The gear 346 has an irregular slot 350 extending radially outwardly from its central portion 352 which receives a reduced diameter portion of the knob shaft 354. Fixed to the knob shaft 354 alongside the gear 346 is a cam 356 provided with a central hub portion 358 and a generally T-shaped cut out portion 360 having the radially extending stem portion 361 of the cut out portion 360 receiving a projecting tang 362 extending from the outer end of the slot 350 in the gear 346. The radially extending slot 350 extends toward the interrupted portion 348 of the gear 346 near the start of the toothed portion. The gear 346 is resiliently held centrally located by a semi-elliptic wire spring 364 having one outer end portion resting upon the tang 366 struck out from the gear 346 into the radial stem portion 361 of the cut out portion 360. The opposite end of the spring 364 rests upon a shoulder 368 of the cut out portion. The mid-portion of the spring 364 rests in a groove provided in the hub 358 of the cam 356 as shown in FIGURE 36. This arrangement through the tang 362 provides a direct drive between the gear 346 and the cam 356. The purpose of the yieldable mounting of the gear 346 is to provide resiliency of the gear 346 in the direction away from the interrupted portion 348 so that jamming of the gearing will be prevented in the event that the tip of the first tooth of the gear 346 should engage the tip of any of the teeth of the pinion 344. Thus, if a tooth on the gear 346 should engage the tip of a tooth upon the pinion 344 adjacent the interrupted portion 348, the gear 346 would move away from the pinion 344 a sufficient amount to prevent damage of the mechanism. Further rotation of the pinion 344 would cause the teeth to properly mesh and properly drive the gear 346.

The cam 356 is provided with a hook-shaped cam follower 370 which is pivoted by a suitable rivet 372 to a second or small back plate 374 which also supports the clock motor 72 and its field 74. The cam 356 is provided with a deep notch 376 which is located to receive the hooked end of the cam follower 370 in the audible buzzing position of the dial 68 which is shown in FIGURE 1. This dial 68 is fixed to the knob shaft 354. In this position, the interrupted portion 348 is adjacent the pinion 344 so that no driving connection exists in this position between the teeth of the pinion 344 and the teeth of the gear 346. The engagement of the hooked end of the cam follower 370 with the deep notch 376 is sufficient to hold the cam 356 and the gear 346 in this position until it is manually turned to another position.

In this position, the vibratable reed 378 is free to vibrate into and out of contact with the core 74 of the field winding 76. This reed 378 has a mounting portion 380 attached to the second back plate 374. It has a convex contact portion 382 of small curvature adapted to contact the adjacent portion of the core 74 intermittently to make an audible buzzing sound. The alternating current energization of the field winding 76 causes the convex contact portion 382 to be alternately attracted and repelled by the core 74 so as to produce the continuous vibration and intermittent contacting of the core 74. The forming of the end portion 382 into a convex surface of small curvature improves the efficiency of the magnetic attraction of the core 74 for the reed 378 since it provides the smallest average gap with the minimum contact.

When it is desired to shut off the buzzer, the knob 66 is turned so that the dial 68 in cooperation with the indicator 70 designates the off position. In this movement, the cam 356 is turned in a clockwise direction as viewed in FIGURE 37 so that the hooked end of the cam follower 370 is moved outwardly while a slightly notched shoulder at one side of the deep notch 376 moves into contact with the hooked end of the follower 370 to hold it outwardly. This causes a projection 386 extending from the cam follower 370 through a window 388 of the second back plate 374 to engage a shoulder upon the reed 378 to hold it out away from contact with the core 74 to prevent the buzzing or vibration of the reed 378 into contact with the core 74. If it is desired to limit the setting of the time signal or minute minder to the clockwise direction, the cam 356 may be provided with a high projection 389 directly adjacent the shoulder 384 so as to prevent further rotation of the cam 356 in the clockwise direction as shown in FIGURE 37. However, if it is desired to permit the setting of the time signal or minute minder in either direction, the cam 356 may be provided with a lower projection 390 at one side of the shoulder 384 as shown in FIGURE 39.

To set the time signal or minute minder, the knob 66 and dial 68 are turned in the clockwise direction as viewed in FIGURE 1 to the desired number of minutes which are to elapse before the audible time signal or buzzer is to sound. This is a counterclockwise rotation as viewed from the back in FIGURE 37 causing cam 356 to first move the shoulder 384 and the deep notch 376 away from the follower 370 and to cause the hook-shaped end of the follower 370 to ride upon the long uniform peripheral surface 392 which corresponds to the minute positions upon the dial 68. When the hook-shaped end of the cam follower 370 is in contact with the peripheral portion 392 of the cam 356, the projection 386 of the cam follower 370 will be in engagement with the vibrating reed 378 to prevent its contacting the core 74 and make an audible buzzing sound. The cam follower 370 has its hooked end held in engagement with the periphery of the cam 356 by a cantilever wire spring 394 having one end held within a notch in the tab 396 struck out from the second back plate 374 and having an adjacent humped portion held by an adjacent second tab 398. The opposite end of the wire spring 394 bears against a projection 401 struck out from the cam follower 370 between its hook-shaped end portion and the rivet 372 serving as the pivot pin.

The second back plate 374 is supported from the front plate 40 by three studs 403, 405 and 407 as well as the studs 409 and 411 which also support the back plate 249. The back plate 249 is also supported by the studs 413 and 415. The back plate 249 also supports a thick sheet of insulating material 247 which supports the switch contact mechanism 243 and related switch members 320—328 within an opening 419 within the back plate 249. The stud 405 also provides a bearing for the idler pulleys 166 and 172 while the stud 413 serves as a bearing for the idler pulleys 180 and 184. The stud 407 provides a bearing for the pulley 144 while the stud 415 provides a bearing for the pulley 146. These pulleys are made of nylon and rotate readily upon these studs without any lubrication. The clock gearing is concealed by the gear bridge 88 shown in FIGURE 5.

While the embodiments of the invention as herein disclosed constitute preferred forms, it is to be understood that other forms might be adopted.

What is claimed is as follows:

1. Control mechanism including first and second rotatable devices coaxially mounted, an axially movable means movably connected to the first rotatable device and coacting with the second rotatable device to provide relative movement, first manual setting and holding means for setting and holding said second rotatable device, second manual setting means for rotating said first rotatable device relative to the second rotatable device, a rotatable driving means, said first rotatable device being provided with engageable means engageable by said driving means to establish a driving relationship for rotation relative to said second rotatable device, a biased control means biased from one position to another, resilient means having sufficient force for overcoming said bias for moving said control means from said another position to said one position and for resiliently holding said control means in said one position, means responsive to the setting of said second means for overcoming said resilient means, said engageable means being provided with latch means for preventing the operation of said control means from one position to another and being responsive to its engagement by said driving means to release said latch means, and means responsive to the coaction between said second rotatable device and said axially movable means for releasing said resilient means to move said control means from said another position to said one position.

2. Control mechanism including first and second rotatable devices coaxially mounted, an axially movable means movably connected to the first rotatable device and coacting with the second rotatable device to provide relative movement, first manual setting and holding means for setting and holding said second rotatable device, second manual setting means for rotating said first rotatable device relative to the second rotatable device, a rotatable driving means, a pivoted member mounted upon said first rotatable device, means for moving said pivoted member into the path of said driving means to cause the driving means to drive said first rotatable device, said axially movable means having means for moving said pivoted member out of the path of said driving means.

3. Control mechanism including shaft means having an axially movable portion, two members rotatably mounted coaxially relative to said shaft means, a third member fixed to said axially movable portion, a cam member loosely connected to said third member provided with cam means cooperating with said two members, said two members being provided with means cooperating with said cam means.

4. Control mechanism including shaft means having an axially movable portion, two members rotatably mounted coaxially relative to said shaft means, a third member fixed to said axially movable portion, a cam member loosely connected to said third member provided with cam means cooperating with said two members, said two members being provided with diametrically opposite apertures, said cam member having extensions extending through said apertures, said cam means being in the form of cam surfaces provided upon said extensions.

5. Control mechanism including a drive pinion, a gear having interrupted teeth adapted to mesh with and to unmesh from a drive pinion, a shaft upon which said gear is mounted, an alternating current electric motor for driving said pinion, said motor having a magnetic means, a vibratable reed having a portion of magnetic material extending into the magnetic field of said magnetic means, said portion of said reed having a convex surface of small curvature facing and contacting said magnetic means, and control means operably connected to said gear for engaging said reed to prevent its vibration whenever the gear teeth are in engagement with said pinion and for disengaging said reed when the interruptions of the teeth prevent engagement with said pinion.

6. Control mechanism including shaft means having an axially movable portion, first and second rotatable devices coaxially mounted relative to said shaft means, an axially movable auxiliary bridge means fixed to said axially movable portion, and rotatable upon the axis of said shaft means, a primary bridge means normally in engagement with and loosely connected with said auxiliary bridge means and having a rotatable driving relationship with said first device and having cam means cooperating with said second device for axially moving both the primary and auxiliary bridge and said axially movable portion, a control element mounted upon said axially movable portion, a latch lever pivotally mounted on said first device pivotable to latch and unlatch said control element, a rotatable drive means coaxially mounted relative to said shaft means, a second lever pivotally mounted upon said latch lever provided with biasing means for moving it into the path of said drive means, said latch lever being pivoted to unlatching position by the engagement of the drive means with the second lever to release said control element, said auxiliary bridge means being provided with means for engaging and moving said second lever out of the path of said drive means, and a control device controlled by the axial movement of said control element.

7. Control mechanism including shaft means having an axially movable portion, first and second rotatable devices coaxially mounted relative to said shaft means, an axially movable auxiliary bridge means fixed to said axially movable portion, and rotatable upon the axis of said shaft means, a primary bridge means normally in engagement with and loosely connected with said auxiliary bridge means and having a rotatable driving relationship with said first device and having cam means cooperating with said second device for axially moving both the primary and auxiliary bridge and said axially movable portion, a control element mounted upon said axially movable portion, a latch lever pivotally mounted on said first device pivotable to latch and unlatch said control element, a rotatable drive means coaxially mounted relative to said shaft means, a second lever pivotally mounted upon said latch lever provided with biasing means for moving it into the path of said drive means, said latch lever being pivoted to unlatching position by the engagement of the drive means with the second lever to release said control element, said auxiliary bridge means being provided with means for engaging and moving said second lever out of the path of said drive means, spring means for biasing said primary and auxiliary bridge means axially toward said second rotatable device for operating said second lever and said control element, and a biased control device operatively connected to said control element and biasing said control element in a direction opposite the biasing of said spring means.

8. Control mechanism including a drive pinion, a shaft, a gear having interrupted teeth adapted to mesh with and to unmesh from said pinion, said teeth being interrupted throughout an arc of limited length upon the periphery of said gear, said gear having a slot receiving said shaft at its central end and extending radially therefrom toward said arc, and spring means for resiliently urging said shaft into the central end of said slot, cam means upon said shaft having a radially extending recess, said gear having a projection adjacent the outer end of its slot extending into said recess to couple said gear and said cam means.

9. Control mechanism including shaft means having an axially movable portion, a control element mounted upon said axially movable portion first and second rotatable devices coaxially mounted relative to said shaft means, a latch lever for latching and unlatching said control element and pivotally mounted upon said first rotatable device upon an axis substantially parallel to said shaft means, a rotatable drive means coaxially mounted relative to said shaft means, a second lever movable into and out of the path of said rotatable drive means and pivotally mounted upon said latch lever upon an axis substantially transverse to and displaced from the pivoting axis of said latch lever, and means responsive to the coaction of said first and second rotatable devices for axially moving said axially movable portion.

10. Control mechanism including first and second rotatable devices coaxially mounted, a lever pivotally mounted upon said first device upon an axis transverse to the axis of said devices, a drive means rotatable upon the axis of said devices, said lever having a first projection for engagement by said drive means, spring means acting upon said lever to move said first projection into the path of said drive means, an axially movable means coacting with said first and second rotatable devices, said lever having a second projection extending into the path of and engaged by said axially movable means for moving said first projection out of the path of said drive means.

11. Control mechanism including first and second rotatable devices coaxially mounted, a lever pivotally mounted upon said first device upon an axis transverse to the axis of said devices, a drive means rotatable upon the axis of said devices, said lever having a first projection for engagement by said drive means, spring means acting upon said lever to move said first projection into the path of said drive means, said second device being provided with a cam, said lever having a second projection extending into the path of and engaged by said cam for moving said first projection out of the path of said drive means.

References Cited in the file of this patent

UNITED STATES PATENTS

| | | |
|---|---|---|
| 472,972 | Appleby et al. | Apr. 19, 1892 |
| 1,983,448 | Florman | Dec. 4, 1934 |
| 2,027,531 | Hammond | Jan. 14, 1936 |
| 2,166,683 | Grayson | July 18, 1939 |
| 2,702,322 | Truesdale | Feb. 15, 1955 |
| 2,886,106 | Gallagher | May 12, 1959 |
| 2,917,939 | Harris | Dec. 22, 1959 |